United States Patent
Wu et al.

(10) Patent No.: US 12,075,328 B2
(45) Date of Patent: Aug. 27, 2024

(54) METHOD AND APPARATUS FOR REPORTING LINK ASSISTANT INFORMATION AND TRANSMITTING DATA

(71) Applicant: LENOVO (BEIJING) LIMITED, Beijing (CN)

(72) Inventors: Lianhai Wu, Beijing (CN); Jing Han, Beijing (CN); Hongmei Liu, Beijing (CN); Jie Shi, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 451 days.

(21) Appl. No.: 17/421,353

(22) PCT Filed: Jan. 15, 2019

(86) PCT No.: PCT/CN2019/071817
§ 371 (c)(1),
(2) Date: Jul. 7, 2021

(87) PCT Pub. No.: WO2020/147017
PCT Pub. Date: Jul. 23, 2020

(65) Prior Publication Data
US 2021/0400560 A1    Dec. 23, 2021

(51) Int. Cl.
  *H04W 40/12*    (2009.01)
  *H04W 40/28*    (2009.01)
  *H04W 40/32*    (2009.01)
(52) U.S. Cl.
  CPC ........... *H04W 40/12* (2013.01); *H04W 40/28* (2013.01); *H04W 40/32* (2013.01)

(58) Field of Classification Search
  CPC ..... H04W 40/12; H04W 40/28; H04W 40/32; H04W 24/10; H04W 28/0231; H04W 40/22; H04L 47/28
  See application file for complete search history.

(56) References Cited

U.S. PATENT DOCUMENTS 9,155,020 B1    10/2015  Graffagnino et al.
2009/0175175 A1*    7/2009  Somasundaram .... H04W 72/04
                                                                370/242
(Continued)

FOREIGN PATENT DOCUMENTS

CN    107852363 A    3/2018
CN    108886722 A    11/2018

OTHER PUBLICATIONS

LG Electronics Inc., Consideration on backhaul link enhancement for IAB, 3GPP TSG-RAN WG2 Meeting #104, R2-1818231, Nov. 12-16, 2018, pp. 1-2, Spokane, USA.

(Continued)

*Primary Examiner* — Mohamed A Kamara
(74) *Attorney, Agent, or Firm* — Kunzler Bean & Adamson

(57) ABSTRACT

The present disclosure relates to methods and apparatuses. According to some embodiments of the disclosure, a method includes: receiving, at an integrated access and backhaul node, configuration information from a base station, the configuration information comprising parameters for reporting of assistant information on a backhaul link; and transmitting a message indicating the assistant information on a backhaul link according to the configuration information.

19 Claims, 10 Drawing Sheets

(56) References Cited

U.S. PATENT DOCUMENTS

| | | | | |
|---|---|---|---|---|
| 2015/0282107 A1* | 10/2015 | Vrind | ............... | H04W 76/19 |
| | | | | 370/252 |
| 2019/0149421 A1* | 5/2019 | Jin | ............... | H04L 5/0078 |
| | | | | 370/331 |
| 2020/0036484 A1* | 1/2020 | Kim | ............... | H04L 1/16 |
| 2020/0145860 A1* | 5/2020 | Koskela | ............... | H04W 76/14 |
| 2021/0159968 A1* | 5/2021 | Fujishiro | ............... | H04L 1/16 |
| 2021/0195674 A1* | 6/2021 | Park | ............... | H04W 76/18 |
| 2022/0038381 A1* | 2/2022 | Lohr | ............... | H04L 47/34 |

OTHER PUBLICATIONS

Huawei, Hisilicon, Topology type, discovery and update for IAB, 3GPP TSG-RAN WG2 Meeting #102, R2-1808668, May 21-25, 2018, pp. 1-5, Busan, Korea.

Internation Searching Authority, "Written Opinion of the International Searching Authority," PCT/CN2019/071817, Oct. 10, 2019, pp. 1-3.

Lenovo, Motorola Mobility, Backhaul link reselection, 3GPP TSG-RAN WG2 Meeting #102, R2-1807902, May 21-25, 2018, pp. 1-4, Busan, Korea.

* cited by examiner

METHOD AND APPARATUS FOR REPORTING LINK ASSISTANT INFORMATION AND TRANSMITTING DATA

TECHNICAL FIELD

The present disclosure generally relates to wireless communication technology, and more particularly link assistant information report and data transmission in a wireless communication system.

BACKGROUND

A wireless communication system may include a base station (hereinafter referred to as "BS") which is in communication with a user equipment (hereinafter referred to as "UE"). UE may include a mobile device (e.g., a cell phone, a tablet, a laptop, an internet-of-things (IoT) device, etc.). Quality of communication link or channel between a BS and a UE may deteriorate due to various factors, for example but is not limited to blockage of building(s), relatively long distance between the BS and the UE, etc. One of some solutions to resolve this problem may include deployment of relay nodes (hereinafter referred to as "RNs") in the wireless communication system to enhance and/or expand coverage of the BS, as disclosed in the 3rd Generation Partnership Project 3GPP).

A BS, which communicates with a UE through one or more RNs, is called a donor BS. These RNs together with the donor BS form a backhaul link allowing the UE to reach the donor BS through one or more RNs. Signals from the UE may also be simply transmitted from one RN directly to the donor BS. An Integrated Access and Backhaul (hereinafter referred to as "TAB") architecture, which is evolved from RNs deployment in 3GPP, is being developed to support multi-hop relay in a New Radio (NR) communication network.

Nevertheless, the backhaul link may fail in certain conditions, and therefore a new solution is required to secure data or signal transmission.

SUMMARY OF THE DISCLOSURE

An embodiment of the present disclosure provides a method, including: receiving, at an integrated access and backhaul node, configuration information from a base station, the configuration information comprising parameters for reporting of assistant information on a backhaul link; and transmitting a message indicating the assistant information on a backhaul link according to the configuration information.

Another embodiment of the present disclosure provides a method, including: transmitting configuration information comprising parameters for reporting of assistant information on a backhaul link; and receiving a message indicating the assistant information on a backhaul link between an integrated access and backhaul node and an access node of the integrated access and backhaul node according to the configuration information.

Yet another embodiment of the present disclosure provides an apparatus. According to an embodiment of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the computer executable instructions are programmed to implement a method according to an embodiment of the present disclosure with the at least one receiving circuitry, the at least one transmitting circuitry and the at least one processor.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
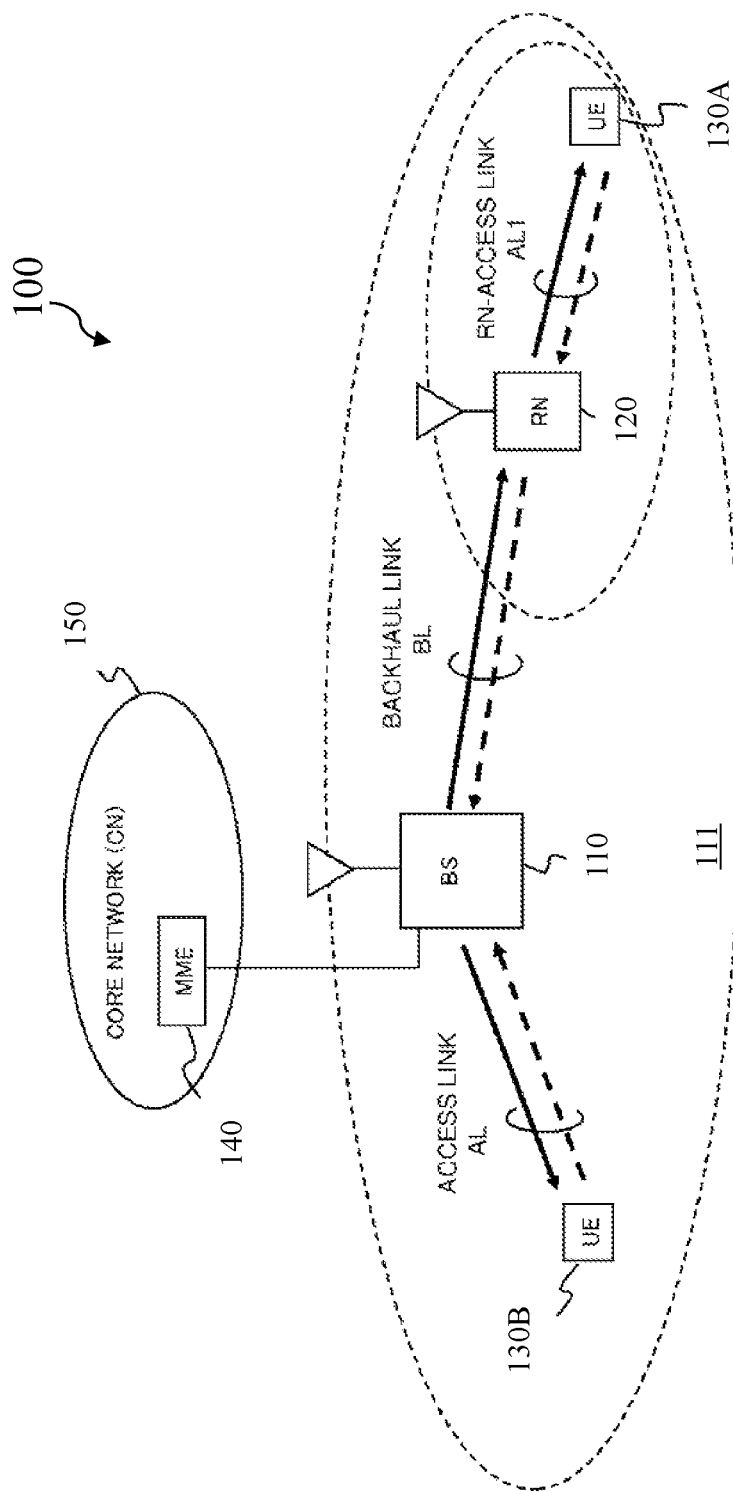
FIG. 1 illustrates a schematic wireless communication system according to an embodiment of the present disclosure.

FIG. 1 illustrates a wireless communication system 100 according to an embodiment of the present disclosure.

Referring to FIG. 1, a wireless communication system 100 includes some nodes (e.g., BS 110 and RN 120) and some UEs (e.g., UE 130A and UE 130B). Although, for simplicity, merely two nodes are illustrated in FIG. 1, it is contemplated that wireless communication system 100 may also include more or less nodes in some embodiments of the present disclosure. Although, for simplicity, merely two UEs are illustrated in FIG. 1, it is also contemplated that wireless communication system 100 may include more or less UEs in some embodiments of the present disclosure.

The BS 110, which communicates with a Core Network (CN) 150, may operate or work under the control of a Mobility Management Entity (MME) 140. The core network may include a Home Subscriber Server (HSS) (not shown), which communicatively coupled with the MME. The BS 110 may operate, for example based on the standard protocol such as Long-Term Evolution (LTE), LTE-Advanced (LTE-A), New Radio (NR), or other suitable protocol(s). For example, the BS 110 may include an eNB or a gNB, and may define one or more cells (e.g., cell 111). The RN 120 may include a relay node or an integrated access and backhaul node (IAB node). UE 130A may include, for example but is not limited to, a computing device, a wearable device, a mobile device, an IoT device, etc. UE 130B may include a device that is the same or similar to UE 130A. UE 130B may also include device different from UE 130A. Persons skilled in the art should understand that as technology develops and advances, the terminologies described in the present disclosure may change, but should not affect or limit principle and spirit of the present disclosure.

BS 110 (or Donor BS) may establish radio connections to UE 130B and RN 120 through an Access Link (AL) and a Backhaul Link (BL) based on protocol Layer-1 (Physical Layer) to Layer-3 (Radio Resource Control (RRC) Layer), respectively.

In some embodiments of the present disclosure, RN 120 may establish a radio connection to UE 130A through a RN-access link (AL1) based on protocol Layer-1 to Layer-3. In some other embodiments of the present disclosure, the RN 120 may establish a radio connection to the UE 130A through the AL1 based on protocol Layer-1 to Layer-2.

Although FIG. 1 merely shows that the Donor BS 110 is connected to a single UE for simplicity, it is contemplated that the Donor BS 110 may provide or establish connections to multiple UEs. Similarly, although FIG. 1 merely shows that the RN 120 is connected to a single UE for simplicity, it is contemplated that the RN 120 may also provide or establish connections to multiple UEs.

Deployment of RN(s) helps to enhance and/or extend coverage of a BS by a backhaul link. Evolved Universal Terrestrial Radio Access Network (E-UTRAN) supports relaying by having a RN wirelessly connect to an eNB serving the RN, called Donor eNB (DeNB), via a modified version of the Evolved Universal Terrestrial Radio Access (E-UTRA) radio interface, i.e. the BL, also referred to as the Un interface. The radio interface that provides radio protocol connection between RN and the UE is referred to as the Uu interface. Relay function and use of RN/DeNB entities in a network is transparent to the operations of the connected UEs.

As mentioned above, 3GPP is envisioning an IAB architecture for the 5G (NR) communication networks supporting multi-hop relays. In other words, an IAB node may hop through one or more IAB nodes before reaching the IAB Donor. Single hop may be considered a special case of multiple hops. Multi-hop backhauling is relatively beneficial because it provides relatively great coverage extension than single-hop backhauling. In a relatively high frequency radio communication system (e.g., radio signals transmitted in frequency bands over 6 GHz), relatively narrow or less signal coverage may benefit from multi-hop backhauling technique. Multi-hop backhauling further enables backhauling around obstacles, e.g., buildings in urban environments for in-clutter deployments.

The maximum number of hops in RN deployment may depend on various factors, for example but is not limited to, frequency, cell density, propagation environment, traffic load, or other factors. These factors are expected to change over time. Therefore, from the perspective of the network architecture, it is desirable to ensure the flexibility in hop count. On the other hand, as the number of hops increases, scalability issues may arise. For example, performance may degrade or network load may increase to an unacceptable level.

Figure 2:
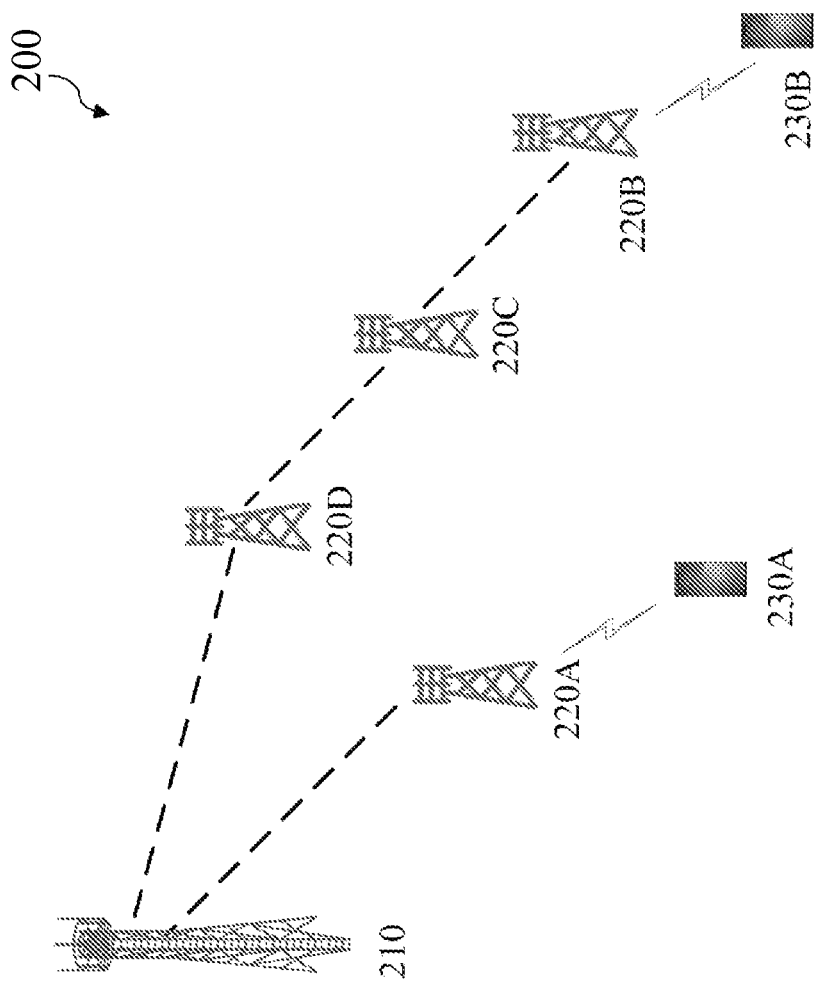
FIG. 2 illustrates a schematic wireless communication system according to an embodiment of the present disclosure.

FIG. 2 illustrates a wireless communication system 200 according to an embodiment of the present disclosure.

Referring to FIG. 2, it is assumed for simplicity that the wireless communication system 200 includes a Donor node (e.g., IAB Donor 210), some IAB nodes (e.g., IAB node 220A, IAB node 220B, IAB node 220C, and IAB node 220D), and some UEs (e.g., UE 230A and UE 230B). Although merely, for simplicity, one Donor node is illustrated in FIG. 2, it is contemplated that wireless communication system 200 may include more Donor node(s) in some embodiments of the present disclosure. Similarly, although merely four IAB nodes are illustrated in FIG. 2 for simplicity, it is contemplated that wireless communication system 200 may include more or less IAB nodes in some embodiments of the present disclosure. Although merely two UEs are illustrated in FIG. 2 for simplicity, it is contemplated that wireless communication system 200 may include more or less UEs in some embodiments of the present disclosure.

IAB node 220A and IAB node 220D are directly connected to IAB Donor 210. IAB node 220A and IAB node 220D may be connected to different Donor nodes in accordance with some other embodiments of the present disclosure.

IAB node 220C can reach IAB Donor 210 by hopping through IAB node 220D. IAB node 220D is a parent IAB node of IAB node 220C. In other words, IAB node 220C is a child node of IAB node 220D. IAB node 220B can reach IAB Donor 210 by hopping through IAB node 220C and IAB node 220D. IAB node 220C and IAB node 220D are upstream IAB nodes of IAB node 220B, and IAB node 220C is a parent IAB node of IAB node 220B. In other words, IAB node 220B is the child node of IAB node 220C. IAB node 220B and IAB node 220C are downstream IAB nodes of IAB node 220D. UE 230A is directly connected to IAB node 220A and UE 230B is directly connected to IAB node 220B.

Each of IAB node 220A, IAB node 220B, IAB node 220C, and IAB node 220D may be directly connected to one or more UE(s) in accordance with some other embodiments of the present disclosure.

Each of IAB node 220A, IAB node 220B, IAB node 220C, and IAB node 220D may be directly connected to one or more IAB node (s) in accordance with some other embodiments of the present disclosure.

In the wireless communication system 200, which provides multi-hop relay, a wireless backhaul link may fail due to, for example but is not limited to, blockage by moving object(s) (e.g., vehicle(s)), foliage (caused by seasonal changes), new buildings (e.g., infrastructure changes). Such backhaul link failure may occur on a physically stationary IAB node or a mobile IAB node. Link switching technique has been developed to address this issue.

For example, assuming a Radio Link Failure (RLF) occurs on the backhaul link between IAB Donor 210 and IAB node 220D, IAB node 220D may establish a link to another Donor node (not shown). In other words, IAB node 220D may switch from the link between IAB node 220D and IAB Donor 210 to a link between IAB node 220D and another Donor node (not shown).

For example, assuming a RLF occurs on the backhaul link between two IAB nodes (e.g., IAB node 220D and IAB node 220C), IAB node 220C may establish a link to another IAB node (e.g., IAB node 220A). In other words, IAB node 220C may switch from the link between IAB node 220C and IAB node 220D to a link between IAB node 220C and a candidate IAB node 220A.

The RLF may be determined by a timer-based approach, a maximum number-based approach, or a threshold for channel quality, which will be detailed below. Other approaches which are not described in the present disclosure may also be employed.

Figure 3:
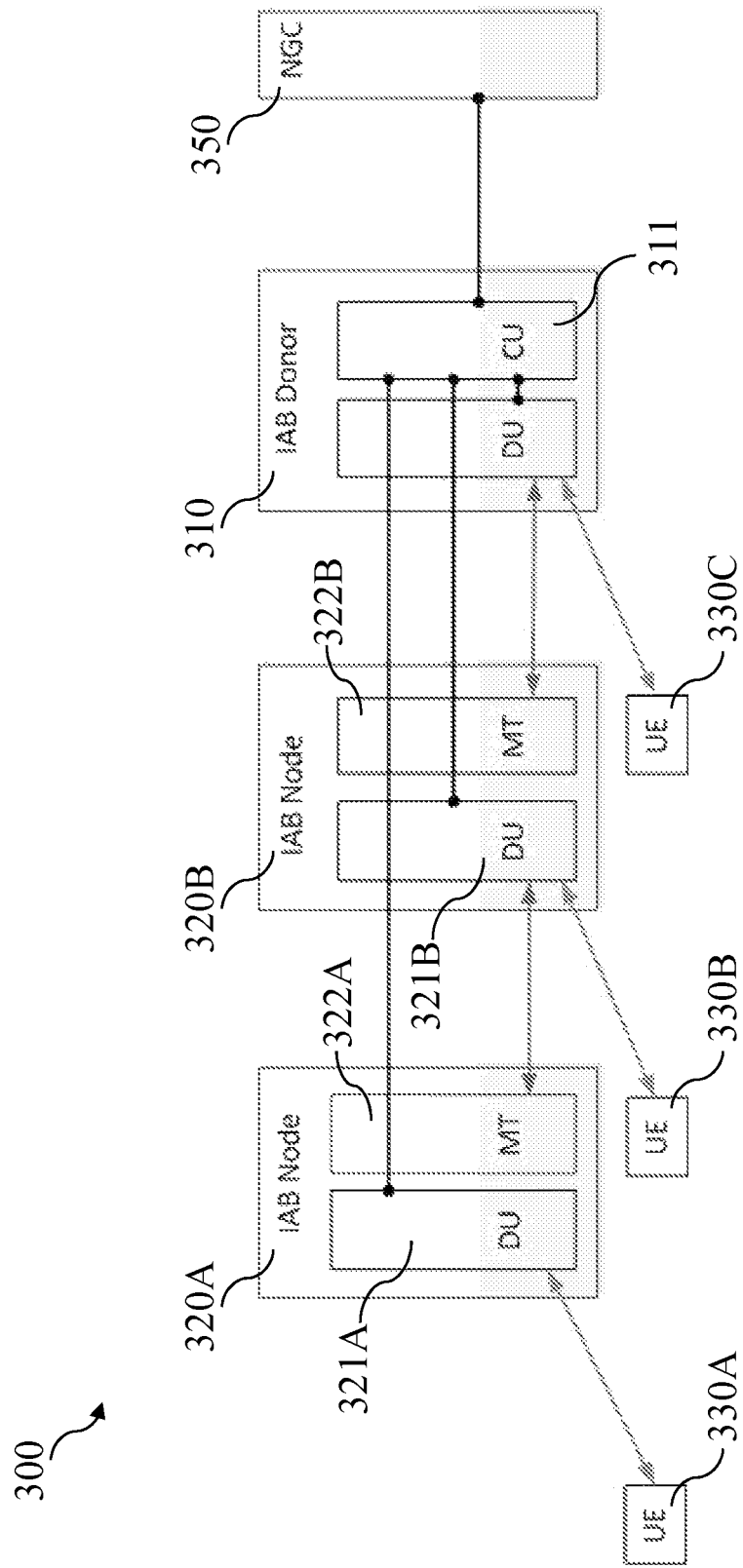
FIG. 3 illustrates a schematic wireless communication system according to an embodiment of the present disclosure.

FIG. 3 illustrates a wireless communication system 300 according to an embodiment of the present disclosure.

Referring to FIG. 3, the wireless communication system 300 may include IAB donor 310, IAB node 320A, IAB node 320B, UE 330A, UE 330B, UE 330C and a Next-Generation Core (NGC).

Each of the IAB node 320A and IAB node 320B may include a Distributed Unit (DU) 321 and a Mobile Termination (MT) 322. In the context of this disclosure, MT is referred to as a function resided in an IAB node that terminates the radio interface layers of the backhaul Uu interface toward an IAB donor or other IAB nodes. The IAB nodes may be connected to an upstream IAB node or a BS (e.g., an IAB donor) via the MT function. The IAB nodes may be connected to UEs and a downstream IAB node via the DU.

IAB node 320A may be connected to an upstream IAB node 320B via MT 322A function. IAB node 320A may be connected to UE 330A via the DU 321A.

IAB node 320B may be connected to an upstream IAB node or IAB donor 310 via MT 322B function. IAB node 320B may be connected to UE 330B via DU 321B. IAB node 320B may be connected to downstream IAB node 320A via DU 321B.

In some embodiments of the present disclosure, IAB nodes as shown in FIG. 3 may include Layer-2 (L2) IAB nodes.

Referring back to FIG. 2, the IAB nodes (e.g., IAB node 220A, IAB node 220B, IAB node 220C, and IAB node 220D) may include L2 IAB nodes.

Referring to FIG. 3, the BS (e.g., IAB donor 310) may include at least one DU to support UEs and MTs of downstream IAB nodes. A Central Unit (CU) 311 included in the IAB donor 310 controls the DUs of all IAB nodes (e.g., IAB node 320A and IAB node 320B) and the DU resided in the IAB donor 310.

In some embodiments, CU 311 of the IAB Donor node 310 is a logical node hosting RRC, Service Data Adaptation Protocol (SDAP) and Packet Data Convergence Protocol (PDCP) layers of the BS. The DU of the BS is a logical node hosting Radio Link Control (RLC) layer, Medium Access Control (MAC) layer and Physical layer (PHY) of the BS. One DU of a BS supports at least one cell. One cell is supported by only one DU of a BS or DU of an IAB node.

As mentioned above, in a wireless communication system supporting multi-hop relays, the backhaul link(s) may fail. In this scenario, an IAB node may select a candidate node to reestablish the backhaul link. Moreover, traffic variations may cause uneven load distribution on the backhaul links, which would lead to congestion on local links or nodes. The network may then reconfigure the network routing or topology to mitigate the congestion.

Topology adaptation refers to procedures that reconfigure the backhaul network under circumstances such as the above-mentioned blockage, local congestion, and so on, without discontinuing services of an IAB node. By employing topology adaptation, the IAB node can provide coverage and service continuity even if a current active backhaul link for the IAB node degrades or fails.

Topology adaptation may be triggered by at least one of the following: integration of an IAB node to the topology of the backhaul network, detachment of an IAB node from the topology, detection of overload, deterioration of link quality or detection of link failure, or other events. Therefore, a procedure of informing the network of change(s) in the backhaul link(s) is required. Moreover, it is also desirable to minimize service disruption and packet loss during topology adaptation.

Embodiments of the present disclosure propose technical solutions for reporting link assistant information and transmitting data, which can at least solve the above problems in the new generation communication systems, such as 5G communication systems. More details on the embodiments of the present disclosure will be illustrated in the following text in combination with the appended drawings.

Figure 4:
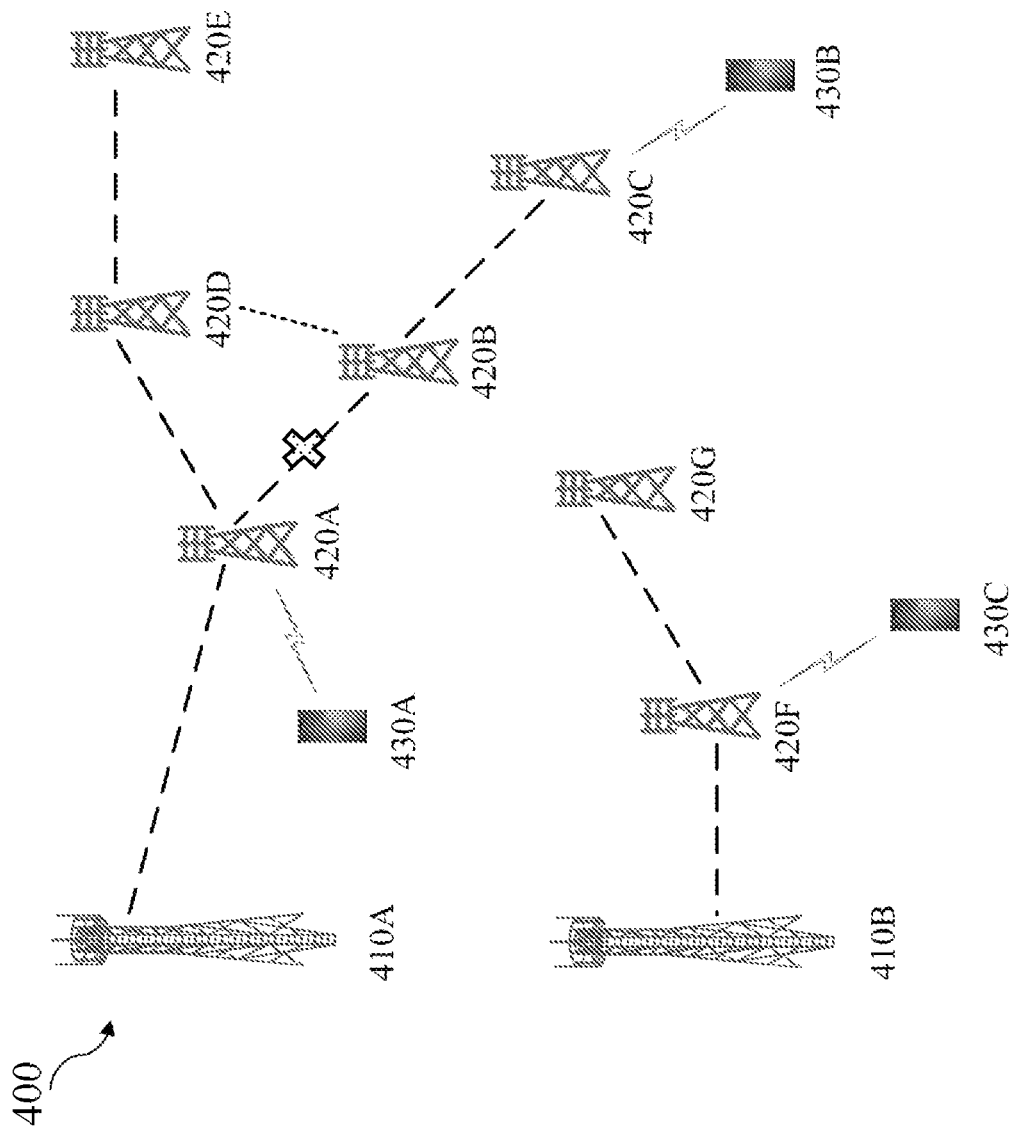
FIG. 4 illustrates a schematic wireless communication system according to an embodiment of the present disclosure.

FIG. 4 illustrates a wireless communication system 400 according to an embodiment of the present disclosure.

Referring to FIG. 4, the wireless communication system 400 may include BSs (e.g., IAB donor 410A and IAB donor 410B), IAB nodes (e.g., IAB node 420A, IAB node 420B, IAB node 420C, IAB node 420D, IAB node 420E, IAB node 420F and IAB node 420G), and UEs (e.g., UE 430A, UE 430B, and UE 430C). Although merely two BSs illustrated in FIG. 4 for simplicity, it is contemplated that wireless communication system 400 may include more BS(s) in some embodiments of the present disclosure. Although merely seven IAB nodes are illustrated in FIG. 4 for simplicity, it is contemplated that wireless communication system 400 may include more or less IAB nodes in some embodiments of the present disclosure. Although merely three UEs are illustrated in FIG. 4 for simplicity, it is contemplated that wireless communication system 400 may include more or less UEs in some embodiments of the present disclosure.

IAB node 420B can reach IAB donor 410A by hopping through IAB node 420A. In other words, route A (e.g., IAB donor 410A→IAB node 420A→IAB node 420B, which is not denoted in FIG. 4), is an available route for IAB node 420B to reach IAB donor 410A. However, under some circumstances, a RLF may occur on the backhaul link between IAB node 420A and IAB node 420B. In this scenario, IAB node 420B may initialize a re-establishment procedure, select a candidate node to reestablish the backhaul link, and access to the candidate node. For example, IAB node 420B may select the IAB node 420G or IAB node 420D to reestablish the backhaul link.

Another solution is to provide a candidate route configured for IAB node 420B. For example, the IAB donor 410A may configure a candidate route for IAB node 420B (e.g., candidate route A': IAB donor 410A→IAB node 420A→IAB node 420D→IAB node 420B, which is not denoted in FIG. 4). In the case that a RLF occurs on the backhaul link between IAB node 420A and IAB node 420B, IAB node 420B may skip candidate node selection and directly access the candidate node (e.g., IAB node 420D) in the candidate route A'. In addition, IAB node 420A may transmit the data for IAB node 420B to IAB node 420D.

Figure 5:
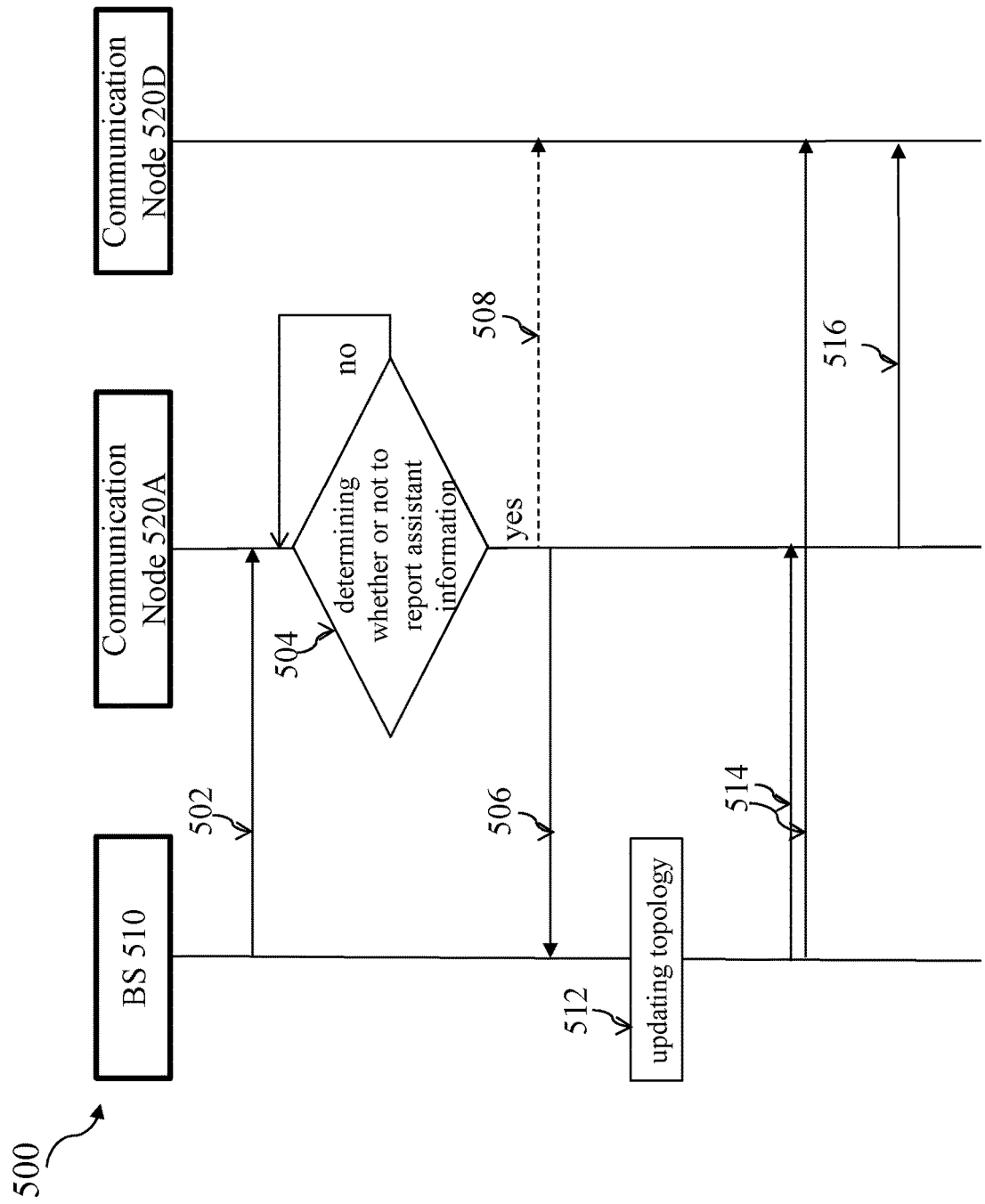
FIG. 5 illustrates a flow chart of an exemplary procedure of reporting link assistant information according to an embodiment of the present disclosure.

FIG. 5 illustrates a flow chart of an exemplary procedure 500 of reporting link assistant information according to an embodiment of the present disclosure.

In FIG. 5, communication nodes 520A and 520D are accessing a BS 510. For example, the communication node 520A may function as IAB node 420A shown in FIG. 4, the communication node 520D may function as IAB node 420D shown in FIG. 4, and the BS 510 may function as IAB donor 410A shown in FIG. 4.

At step 502, the BS 510 may transmit configuration information to a communication node (e.g., the communication node 520A) which is connected to the BS 510.

The configuration information may include parameters for reporting link assistant information that may indicate status of a link and other information associated with the link, if any. The status of a link may include a failure of the link, poor link quality, or other statuses.

In some embodiments of the present disclosure, the configuration information may include information indicating an access node of the communication node, and a value of a timer associated with the access node. The access node may refer to a child node of the communication node or a UE. As described above, a child node of a communication node refers to a node directly connected to the communication node.

For example, referring back to FIG. 4, the IAB donor 410A may transmit configuration information to the IAB node 420A. The configuration information may indicate an access node of the IAB node 420A and a value of a timer associated with the access node. The access node of the IAB node 420A may include at least one of the IAB node 420B, the IAB node 420D, the UE 430A, or other child communication nodes of the IAB nodes 420A or UEs that are not shown in FIG. 4. The configuration information may indicate respective ID of the IAB node 420B, the IAB node 420D or the UE 430A. The configuration information may indicate a value of a respective timer associated with the IAB node 420B, the IAB node 420D or the UE 430A. In other words, the IAB node 420A may initiate a corresponding timer for each access node of the IAB node 420A.

In some embodiments of the present disclosure, the configuration information may include a maximum number of retransmission. For example, the IAB donor 410A may transmit a maximum number of retransmission to the IAB node 420A.

In some embodiments of the present disclosure, the configuration information may include a threshold for a channel quality metric. For example, the IAB donor 410A may transmit a threshold for a channel quality metric to the IAB node 420A. The channel quality metric may include at least one or more of the following Reference Signal Received Power (RSRP), Reference Signal Strength Indicator (RSSI), or Reference Signal Receiving Quality (RSRQ). Other channel quality metrics which are not discussed above may also be employed.

Referring to FIG. 5, at step 504, the communication node 520A may determine whether or not to report the assistant information of a link based on the configuration information. For example, the communication node 520A may determine whether a certain criterion has been satisfied or met based on the configuration information. If it is determined that the criterion has been satisfied, the communication node 520A may transmit a message indicating the link assistant information at step 506 to the BS 510. Meanwhile, the communication node 520A may stop transmitting data on the link between the communication node 520A and an access node of the communication node 520A.

In some embodiments, at step 504, the communication node 520A may determine whether or not a timer corresponding to an access node of the communication node 520A has expired. The timer may be configured according to the confirmation information. The timer may be started upon receiving data from the access node or upon transmitting data to the access node. In other words, the communication node 520A may initiate the timer corresponding to the access node upon receiving data from the access node or upon transmitting data to the access node. The timer may be restarted upon receiving data from the access node or upon transmitting data to the access node. In some embodiments, the data received from the access node or the data transmitted to the access node may include MAC layer data packet, for example, MAC Service Data Unit (SDU).

In the above embodiments, if it is determined that a timer corresponding to a access node of the communication node 520A has expired, the communication node 520A may transmit to BS 510, at step 506, a message indicating assistant information of the link between the communication node 520A and the access node. Meanwhile, the communication node 520A may stop transmitting data to the access node.

In some embodiments, the link assistant information may include an indication for the expiry of the timer and information indicating the timer. In some others embodiments, the link assistant information may include an indication of a failure on a link and information indicating two nodes which terminate the link (e.g., the communication node 520A and the access node).

For example, referring back to FIG. 4, the IAB node 420A may determine whether a timer corresponding to an access node of the IAB node 420A (e.g., the IAB node 420B) has expired. The IAB node 420A may start the timer corresponding to the IAB node 420B upon receiving data from the IAB node 420B, or upon transmitting data to the IAB node 420B. The IAB node 420A may restart the timer corresponding to the IAB node 420B upon receiving data from the IAB node 420B, or upon transmitting data to the IAB node 420B.

If it is determined that the timer corresponding to the IAB node 420B has expired, the IAB node 420A may transmit a message indicating the assistant information on the backhaul link between the IAB node 420A and the IAB node 420B. Meanwhile, the IAB node 420A may stop transmitting data to the IAB node 420B. In some embodiments, the assistant information may include an indication for the expiry of the timer and information indicating the timer, e.g., a timer ID. In others embodiments, the assistant information may include an indication for a failure on the backhaul link and information indicating the IAB node 420A and the IAB node 420B (e.g., the IDs of the IAB node 420A and the IAB node 420B).

Referring to FIG. 5, in some embodiments, at step 504, the communication node 520A may determine, as part of the determination made to report assistant information, whether the number of retransmission to an access node of the communication node 520A exceeds a threshold (e.g., a maximum number of retransmission). In some embodiments, the maximum number of retransmission is configured according to the confirmation information. If it is determined that the number of retransmission to an access node of the communication node 520A exceeds the threshold, the communication node 520A may transmit, at step 506, a message indicating the link assistant information on the link between the communication node 520A and the access node.

In some embodiments, the link assistant information may include an indication of the threshold being exceeded and information indicating two nodes which terminate the link (e.g., the communication node 520A and the access node). In some embodiments, the indication of the threshold being exceeded may indicate a failure on the link between the communication node 520A and the access node.

For example, referring back to FIG. 4, the IAB node 420A may determine whether the number of retransmission to the IAB node 420B exceeds a threshold (e.g., a predetermined number of retransmission). If it is determined that the number of retransmission to the IAB node 420B exceeds the threshold, the IAB node 420A may transmit a message indicating the assistant information on the backhaul link between the IAB node 420A and the IAB node 420B.

In some embodiments, the assistant information may include an indication of the threshold being exceeded together with the information indicating both the IAB node 420A and the IAB node 420B (e.g., the IDs of the IAB node 420A and the IAB node 420B). In some embodiments, the indication of the threshold being exceeded may indicate a failure on the backhaul link between the IAB node 420A and the IAB node 420B.

Referring to FIG. 5, in some embodiments, at step 504, the communication node 520A may determine, as part of the determination made to report assistant information, whether a channel quality of the channel between the communication node 520A and an access node of the communication node 520A is less than a threshold for the channel quality metric. In some embodiments, the threshold for the channel quality metric is configured according to the confirmation information. If it is determined that the channel quality of the channel between the communication node 520A and an access node of the communication node 520A is less than a threshold for the channel quality metric, the communication node 520A may transmit, at step 506, a message indicating the link assistant information on the link between the communication node 520A and the access node.

In some embodiments, the link assistant information may include an indication for a failure on a link and information indicating two nodes which terminate the link (e.g., the communication node 520A and the access node). In some embodiments of the present disclosure, the channel quality of a channel may be determined based on at least one of the following parameters: RSRP, RSSI or RSRQ. Other channel quality metrics which are not discussed above may also be employed.

For example, referring back to FIG. 4, the IAB node 420A may determine whether a channel quality of the channel between the IAB node 420A and an access node (e.g., the IAB node 420B), is less than a threshold of the channel quality metric. The channel quality metric may include at least one or more of RSRP, RSSI, RSRQ, and other channel quality parameters or parameter sets. In some embodiments, the IAB donor 410A may configure the IAB node 420B to transmit Sounding Reference Signals (SRSs). In some embodiments, the IAB node 420A may monitor the SRSs from the IAB node 420B. The IAB node 420A may determine the RSRP based on the received SRS, and subsequently determine whether the RSRP is less than a predetermined threshold for the channel quality metric.

If it is determined that the channel quality of the channel between the IAB node 420A and the IAB node 420B is less than the threshold for the channel quality metric, the IAB node 420A may transmit a message indicating the assistant information on the backhaul link between the IAB node 420A and the IAB node 420B. In some embodiments, the assistant information may include an indication of a failure on the backhaul link, as well as, information identifying the IAB node 420A and the IAB node 420B (e.g., the IDs of the IAB node 420A and the IAB node 420B).

Referring to FIG. 5, at step 512, in response to receiving the link assistant information from the communication node 520A, the BS 510 may update a topology of the communication network. In some embodiments, the BS 510 may update a routing table for the corresponding communication nodes identified in the link assistant information received.

In some embodiments, the configuration information transmitted at step 502 may further include information indicating at least one candidate node. In these embodiments, if it is determined that the criterion has been satisfied based on the configuration information, the communication node 520A may transmit, at step 508 (denoted by dotted arrow as an option), data to at least one candidate node (e.g., the communication node 520D). The communication node 520A may transmit the data via a RLC message. In some embodiments, the data transmitted at step 508 may include data that has not been acknowledged by the access node. In this manner, the communication node 520A can autonomously activate a candidate route without receiving additional configuration from the BS 510, thereby reducing overall latency resulted from a route change. However, the BS 510 may still configure the candidate route after receiving a link assistant information from the communication node 520A (e.g., in step 514).

At step 514, the BS 510 may transmit information indicating at least one candidate node (e.g., communication node 520D) to the communication node 520A. Then, the communication node 520A may transmit, at step 516, data to at least one candidate node (e.g., communication node 520D). In some embodiments, the information indicating the at least one candidate node may further include an indication which instructs the communication node 520A to transmit the data to the at least one candidate node via a RLC message. In these embodiments, the communication node 520A may transmit the data via a RLC message. In some embodiments, the data transmitted at step 516 may include data that has not been acknowledged by the access node. The BS 510 may also transmit, at step 514, the above information to the at least one candidate node (e.g., the communication node 520D). In this manner, the BS 510 may configure one or more candidate routes for the link between the communication node 520A and the access node.

In some embodiments, the at least one candidate node configured by the BS 510 at step 502 or step 514 is a downstream communication node of the communication node 520A.

For example, referring back to FIG. 4, in response to receiving assistant information on a backhaul link (e.g., the link between the IAB node 420A and the IAB node 420B), the IAB donor 410A may transmit information indicating at least one candidate node to the IAB node 420A. The at least candidate one node may, for example, include IAB node 420D. Such information may instruct IAB node 420A and TAB node 420D to perform RLC retransmission and may be forwarded to TAB node 420D by TAB node 420A. The TAB node 420A may then further forward data that has not been acknowledged by TAB node 420B to the TAB node 420D via an RLC message. The TAB node 420D may then, retransmit the received data to the IAB node 420B via an RLC message.

By employing the above procedure as shown in FIG. 5, the BS 510 is aware of change(s) in the network in a timely manner. Moreover, service disruption and packet loss during topology adaptation are mitigated or minimized.

Figure 6A:
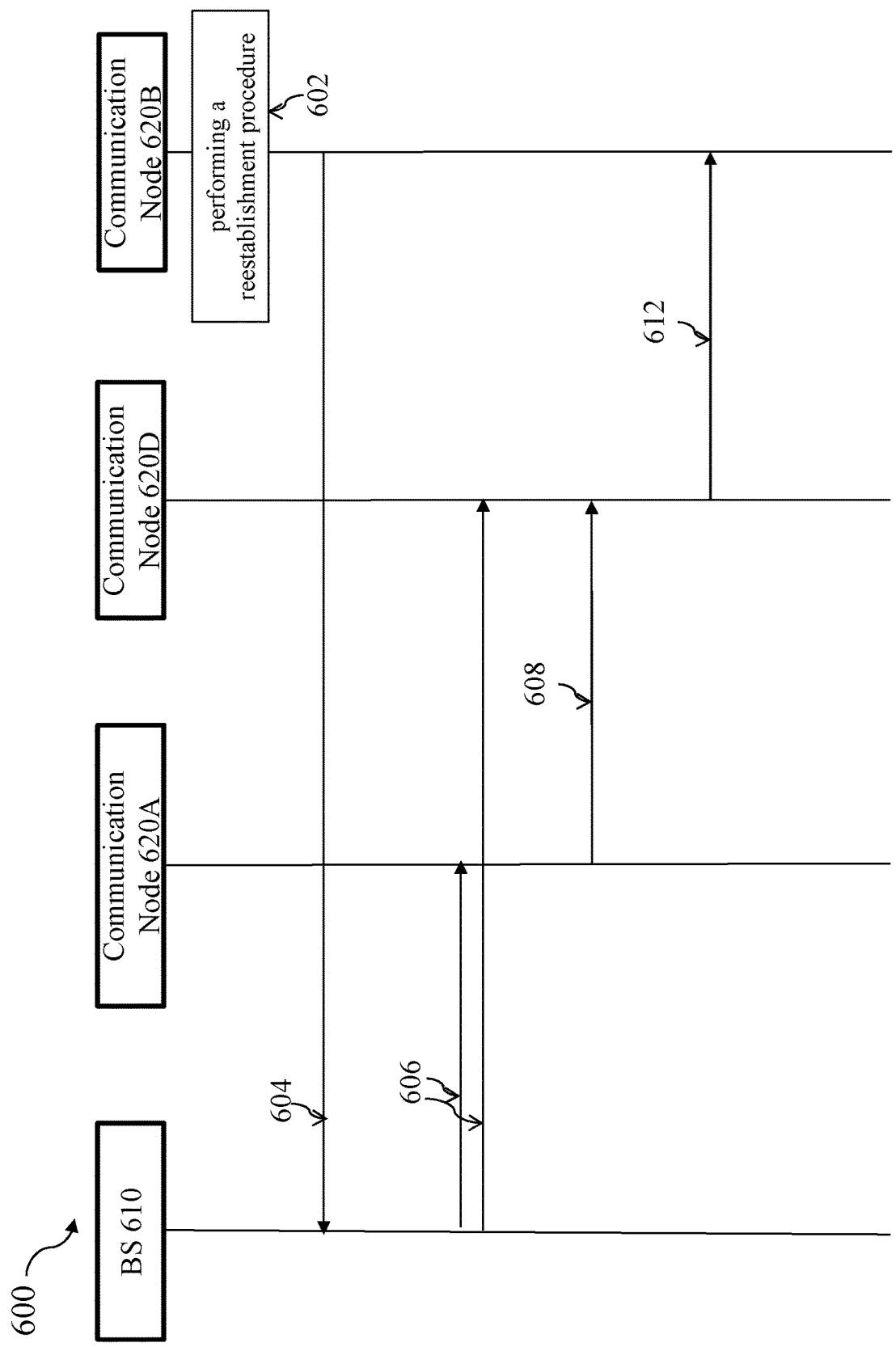
FIG. 6A shows a flow chart of an exemplary procedure of transmitting data according to an embodiment of the present disclosure.
Figure 6B:
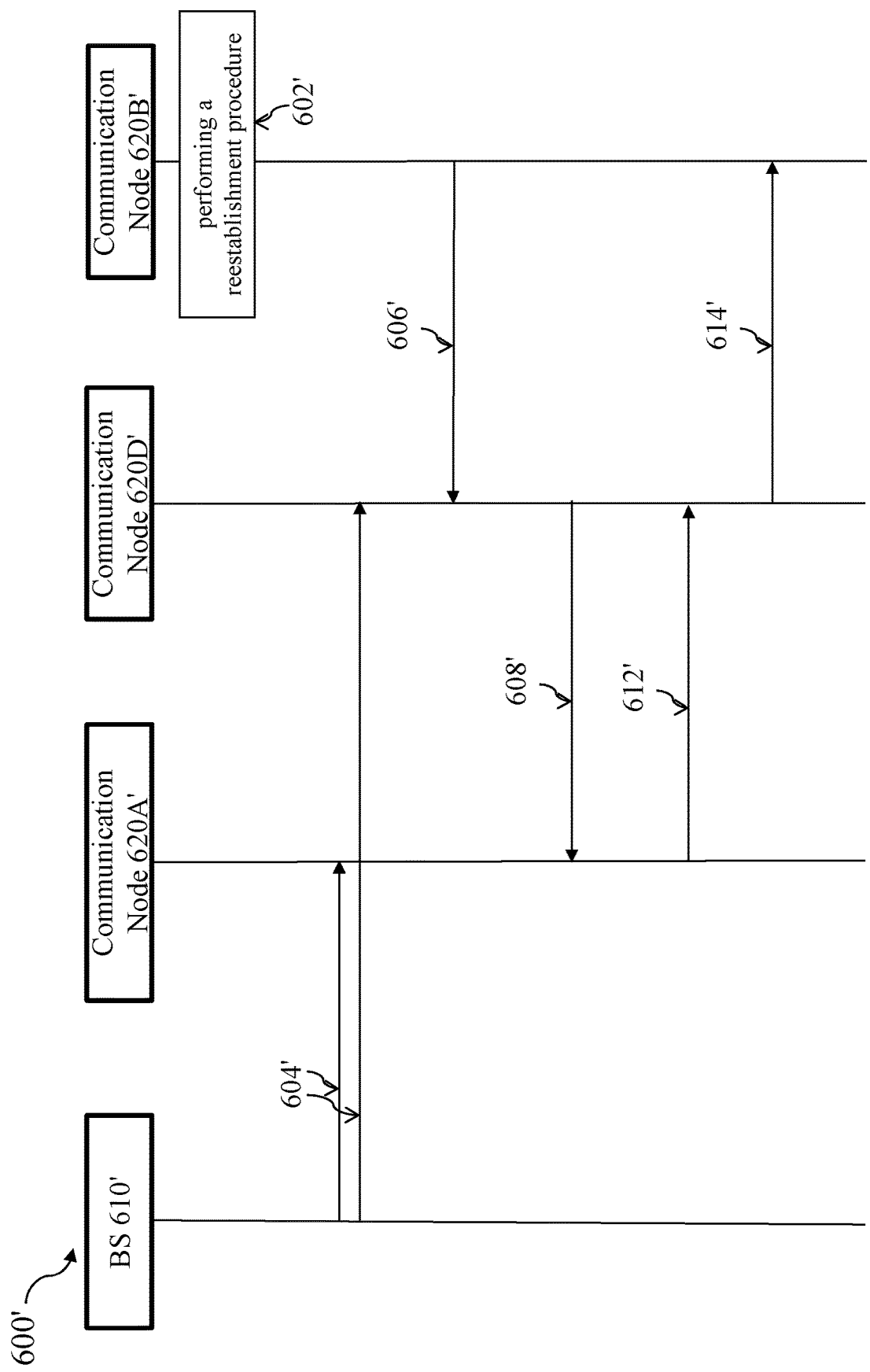
FIG. 6B shows a flow chart of an exemplary procedure of transmitting data according to another embodiment of the present disclosure.

FIG. 6A illustrates a flow chart of an exemplary procedure 600 of transmitting data according to an embodiment of the present disclosure. FIG. 6B illustrates a flow chart of an exemplary procedure 600' of transmitting data according to another embodiment of the present disclosure.

In FIG. 6A, communication nodes 620A, 620B, and 620D are accessing BS 610. For example, the communication node 620A may function as IAB node 420A shown in FIG. 4, the communication node 620B may function as IAB node 420B shown in FIG. 4, the communication node 620D may function as IAB node 420D shown in FIG. 4, and the BS 610 may function as IAB donor 410A shown in FIG. 4.

In FIG. 6B, communication nodes 620A', 620B', and 620D' are accessing a BS 610'. For example, the communication node 620A' may function as IAB node 420A shown in FIG. 4, the communication node 620B' may function as IAB node 420B shown in FIG. 4, the communication node 620D' may function as IAB node 420D shown in FIG. 4, and the BS 610' may function as IAB donor 410A shown in FIG. 4.

In some embodiments of the present disclosure, the procedures in FIGS. 6A and 6B may occur after step 506 in FIG. 512, in place of steps 514 and 516. In some other embodiments of the present disclosure, the procedures in FIGS. 6A and 6B may be applied independently during the reestablishment of a link between the communication node 620B or communication node 620B' and a candidate node.

Referring to FIG. 6A, at step 602, in response to a failure of the link between communication nodes 620B and 620A, the communication node 620B may perform a reestablishment procedure 602, and may select the communication node 620D to reestablish the link. After a successful reestablishment, the communication node 620B may transmit, at step 604, RLC status report to the BS 610. In some embodiments, the RLC status report may be transmitted via an RRC message.

The RLC status report may identify data that has not been acknowledged by the communication node 620B before the failure of the link between the communication nodes 620B and 620A. The RLC status report may be presented in the form of a bitmap. The bitmap may indicate RLC SDUs that have not been acknowledged by Automatic Repeat Requests (ARQs). The bitmap may use a sequence of numbers including "1" and "0" to indicate whether or not data packets M to N are successfully transmitted. For example, for each of the data packets M to N, the bitmap may include an ID of a respective data packet and a value of "1" or "0" to indicate whether or not the respective data packet has been successfully transmitted. The value of "1" may represent that a corresponding data packet has been successfully transmitted, and the value of "0" may represent that the data packet has been not successfully transmitted; or vice versa.

At step 606, in response to receiving the RLC status report from the communication nodes 620B, the BS 610 may transmit the RLC status report to the communication node 620A. The BS 610 may also transmit the RLC status report to the communication node 620D. In some embodiments, at step 606, the BS 610 may inform the communication nodes 620A and 620D to perform RLC retransmission. For example, the BS 610 may transmit a message instructing RLC retransmission to the communication nodes 620A and 620D.

After receiving the RLC status report, the communication node 620A may determine data that has not been acknowledged based on the RLC status report. At step 608, the communication node 620A may transmit the data that has not been acknowledged to the communication node 620D. At step 612, the communication node 620D may retransmit the data that has not been acknowledged to the communication node 620B. In some embodiments, the retransmission of the data may be based on the RLC status report.

Referring to FIG. 6B, similarly to step 602 in FIG. 6A, at step 602', in response to a failure of the link between communication nodes 620B' and 620A', the communication node 620B' may perform a reestablishment procedure and select communication node 620D' to reestablish the link. After a successful reestablishment of the link with the communication node 620D', the BS 610' may inform the communication nodes 620A' and 620D' to perform RLC retransmission at step 604'. For example, the BS may transmit a message instructing RLC retransmission to the communication nodes 620A' and 620D'.

At step 606', the communication node 620B' may transmit a RLC status report to the communication node 620D'. The RLC status report is similar to the one described with respect to FIG. 6A. At step 608', the communication node 620D' may transmit the RLC status report to the communication node 620A'. The communication node 620A' may determine data that has not been acknowledged based on the RLC status report. At step 612', the communication node 620A' may transmit the data that has not been acknowledged to the communication node 620D'. At step 614', the communication node 620D' may retransmit the data that has not been acknowledged to the communication node 620B'. In some embodiments, the retransmission may be based on the RLC status report.

By employing the above procedures described with respect to FIGS. 6A and 6B, packet loss would be mitigated or minimized since the RLC data at a communication node will not be discarded. In this manner, RLC level retransmission may provide enhanced lossless data transmission compared with PDCP level retransmission, and thus is beneficial.

Figure 7:
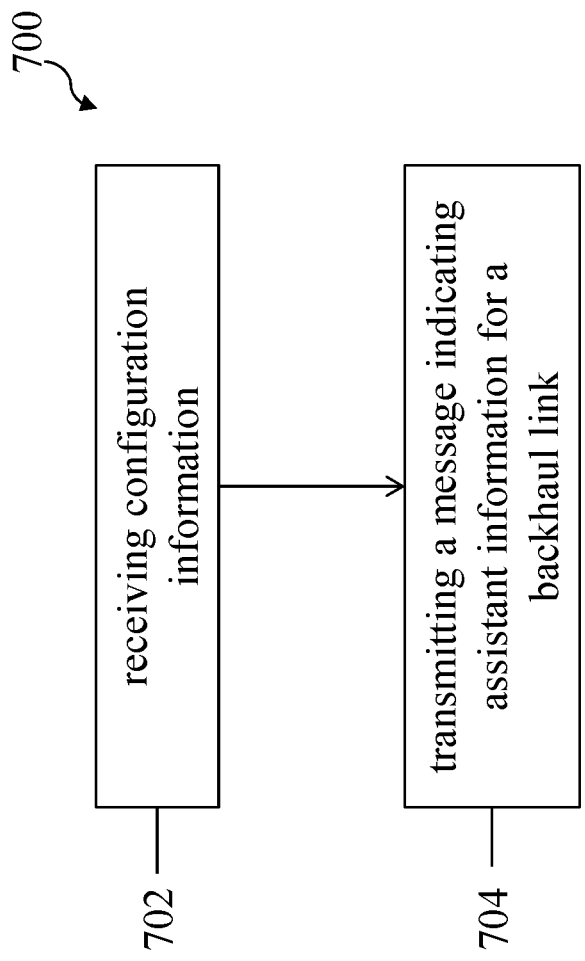
FIG. 7 illustrates a flow chart of an exemplary procedure of reporting link assistant information and transmitting data according to an embodiment of the present disclosure.

FIG. 7 illustrates a flow chart of an exemplary procedure 700 of reporting assistant information of a backhaul link and transmitting data according to an embodiment of the present disclosure. In some embodiments of the present disclosure, the procedure in FIG. 7 may be applied to FIGS. 5, 6A, and 6B. For example, the procedure in FIG. 7 may be performed by the communication nodes in FIGS. 5, 6A, and 6B.

At step 702, an IAB node may receive configuration information from a BS.

The configuration information may include parameters for reporting assistant information on a backhaul link. At step 704, the IAB node may transmit a message indicating assistant information on a backhaul link. The assistant information may be determined according to the configuration information.

In some embodiments of the present disclosure, the configuration information may include information indicating an access node of the IAB node, and a value of a timer associated with the access node. In some embodiments of the present disclosure, the IAB node may start the timer associated with the access node in response to receiving data from the access node, or in response to transmitting data to the access node. In some embodiments of the present disclosure, the IAB node may restart the timer associated with the access node in response to receiving data from the access node, or in response to transmitting data to the access node.

In some embodiments of the present disclosure, the access node may be an IAB node directly connected to the IAB node or a UE.

In some embodiments of the present disclosure, the IAB node may transmit a message at step 704 in response to an expiry of a timer associated with an access node. In some embodiments of the present disclosure, the message may include an indication for the expiry of the timer and information indicating the timer. In some other embodiments of the present disclosure, the message may include an indication for a failure on the backhaul link and information indicating two nodes which terminate the backhaul link.

In some embodiments of the present disclosure, the configuration information may include a maximum number of retransmission. In some embodiments of the present disclosure, the IAB node may transmit the message at step 704 in response to the number of retransmission to an access node of the IAB node exceeds the maximum number of retransmission. In some embodiments of the present disclosure, the message may include an indication of exceeding the maximum number of retransmission and information indicating two nodes which terminate the backhaul link.

In some embodiments of the present disclosure, the configuration information may include a threshold for a channel quality metric. The channel quality metric may include at least one or more of RSRP, RSSI, RSRQ, and other channel quality parameters or parameter sets.

In some embodiments of the present disclosure, the IAB node may transmit the message at step 704 in response to a channel quality of the channel between the IAB node and an access node of the IAB node being less than the threshold for the channel quality metric. In some embodiments of the present disclosure, the channel quality may be determined based on SRS from the access node. In some embodiments of the present disclosure, the message may include an indication for a failure on the backhaul link and information indicating two nodes which terminate the backhaul link.

In some embodiments of the present disclosure, the configuration information received at step 702 may include information indicating at least one candidate node. In these embodiments, the IAB node may transmit data to at least one candidate node according to the configuration information.

In some embodiments of the present disclosure, the IAB node may receive information indicating at least one candidate node from the BS. In some embodiments of the present disclosure, the IAB node may transmit data to the at least one candidate node. In some embodiments of the present disclosure, the information may further indicate transmitting the data to the at least one candidate node via an RLC message.

In some embodiments of the present disclosure, the at least one candidate node may be a downstreaming node of the IAB node and the data is transmitted via a RLC message. In some embodiments of the present disclosure, the data to be transmitted may include data which has not been acknowledged.

In some embodiments of the present disclosure, the IAB node may receive a RLC status report from either the BS or the at least one candidate node. In some embodiments of the present disclosure, the IAB node may determine the data to be transmitted based on the RLC status report received from either the BS or the at least one candidate node.

In some embodiments of the present disclosure, an IAB node may receive, from the BS, a message instructing the transmission of the data via a RLC message.

Figure 8:
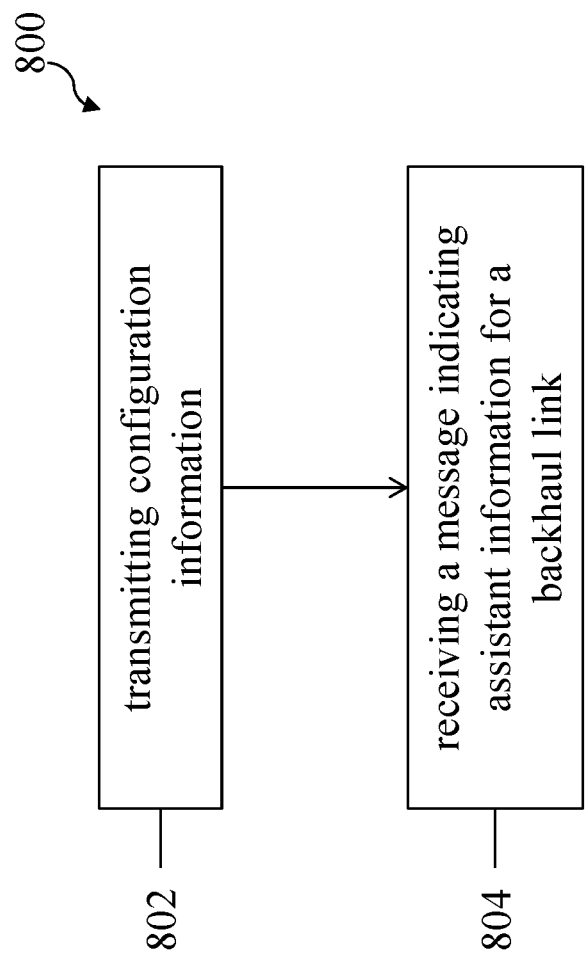
FIG. 8 illustrates a flow chart of an exemplary procedure of configuring a node according to an embodiment of the present disclosure.

FIG. 8 illustrates a flow chart of an exemplary procedure 800 of configuring a node in a backhaul link according to an embodiment of the present disclosure. In some embodiments of the present disclosure, the procedure in FIG. 8 may be applied in conjunction with procedures described in FIGS. 5, 6A, and 6B. For example, the procedure in FIG. 8 may be performed by the BS s in FIGS. 5, 6A, and 6B.

At step 802, a BS may transmit configuration information. The configuration information may include parameters for reporting of assistant information on a backhaul link. At step 804, the BS may receive a message indicating the assistant information on a backhaul link between an IAB node and an access node of the IAB node. The assistant information may be determined according to the transmitted configuration information.

In some embodiments of the present disclosure, configuration information may include information indicating an access node of the IAB node, and a value of a timer associated with the access node. In some embodiments of the present disclosure, the access node may be an IAB node directly connected to the IAB node or a UE.

In some embodiments of the present disclosure, the message received at step 804 may include an indication for the expiry of the timer associated with the access node. The indication may be used to identify the timer. In other embodiments of the present disclosure, the message may also include an indication of a failure on the backhaul link, as well as the information indicating two nodes which terminate the backhaul link.

In some embodiments of the present disclosure, the configuration information may include a maximum number of retransmission. In some embodiments of the present disclosure, the message received at step 804 may include an indication of the number of retransmission from the IAB node to the access node of the IAB node exceeding the maximum number of retransmission and information indicating two nodes which terminate the corresponding backhaul link.

In some embodiments of the present disclosure, the configuration information may include a threshold for a channel quality metric. In some embodiments of the present disclosure, the message received at step 804 may include an indication of a failure on the backhaul link and information indicating two nodes which terminate the corresponding backhaul link.

In some embodiments of the present disclosure, the BS may update a topology of a backhaul network in response to the reception of the message at step 804.

In some embodiments of the present disclosure, the configuration information may include information indicating at least one candidate node. In some embodiments of the present disclosure, the BS may separately transmit information indicating at least one candidate node and the configuration information. In some embodiments of the present disclosure, the BS may instruct the at least one candidate node to perform RLC retransmission.

In some embodiments of the present disclosure, at least one candidate node is a downstream node of the IAB node.

In some embodiments of the present disclosure, the BS may receive an RLC status report from the access node of the IAB node. In some embodiments of the present disclosure, the BS may transmit the RLC status report to the IAB node. In some embodiments of the present disclosure, the BS may receive the RLC status report via a RRC message.

In some embodiments of the present disclosure, the BS may transmit, to the IAB node, a message instructing RLC retransmission.

Figure 9:
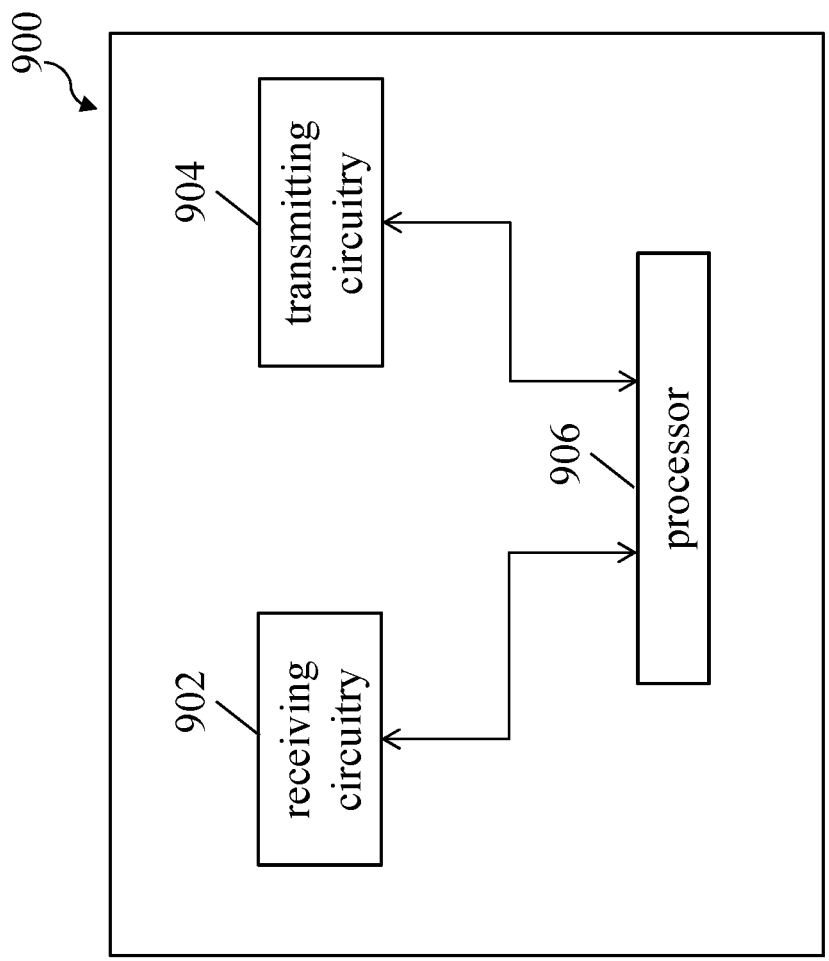
FIG. 9 illustrates an example block diagram of an apparatus according to an embodiment of the present disclosure.

FIG. 9 illustrates an example block diagram of an apparatus 900 according to an embodiment of the present disclosure.

As shown in FIG. 9, the apparatus 900 may include at least one non-transitory computer-readable medium (not shown), a receiving circuitry 902, a transmitting circuitry 904, and a processor 906 coupled to the non-transitory computer-readable medium (not shown), the receiving circuitry 902 and the transmitting circuitry 904. The apparatus 900 may be a BS or a communication node. In some embodiments, the apparatus 900 is an IAB donor. In some other embodiments, the apparatus 900 is an IAB node.

Although in this figure, elements such as processor 906, transmitting circuitry 904, and receiving circuitry 902 are described in the singular, the plural is contemplated unless limitation to the singular is explicitly stated. In some embodiments of the present disclosure, the receiving circuitry 902 and the transmitting circuitry 904 are combined into a single device, such as a transceiver. In certain embodiments of the present disclosure, the apparatus 900 may further include an input device, a memory, and/or other components.

In some embodiments of the present disclosure, the non-transitory computer-readable medium may have stored thereon computer-executable instructions to cause a processor to implement the method with respect to the communication node as described above. For example, the computer-executable instructions, when executed, cause the processor 906 interacting with receiving circuitry 902 and transmitting circuitry 904, so as to perform the steps with respect to the communication node depicted in FIGS. 5, 6A, 6B and 7.

In some embodiments of the present disclosure, the non-transitory computer-readable medium may have stored thereon computer-executable instructions to cause a processor to implement the method with respect to the BS as described above. For example, the computer-executable instructions, when executed, cause the processor 906 interacting with receiving circuitry 902 and transmitting circuitry 904, so as to perform the steps with respect to the BS depicted in FIGS. 5, 6A, 6B and 8.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

The following is what is claimed:

1. A method performed by an integrated access and backhaul (IAB) node, the method comprising:
   receiving configuration information from a base station, the configuration information comprising:
   parameters for reporting assistant information on a backhaul link;
   an indication of an access node of the IAB node; and
   a value of a timer associated with the access node;
   transmitting a message indicating the assistant information on the backhaul link according to the configuration information; and
   starting the timer in response to receiving data from the access node; or
   starting the timer in response to transmitting data to the access node.

2. The method of claim 1, wherein the access node is directly connected to the IAB node or is a user equipment (UE).

3. The method of claim 1, further comprising:
   restarting the timer in response to receiving data from the access node;
   restarting the timer in response to transmitting data to the access node;
   or a combination thereof.

4. The method of claim 1, wherein the message is transmitted in response to an expiry of the timer.

5. The method of claim 4, wherein the message comprises an indication for the expiry of the timer, or the message comprises an indication for a failure in the backhaul link and information indicating two nodes which terminate the backhaul link.

6. The method of claim 1, wherein the configuration information comprises a maximum number of retransmissions.

7. The method of claim 6, wherein the message is transmitted in response to the number of retransmissions to an access node of the IAB node exceeds the maximum number of retransmissions.

8. The method of claim 7, wherein the message comprises an indication that the maximum number of retransmissions has been exceeded and information indicating two nodes which terminate the backhaul link.

9. The method of claim 1, wherein the configuration information comprises a threshold for a channel quality metric.

10. The method of claim 9, wherein the message is transmitted in response to a channel quality of the channel between the IAB node and the access node of the IAB being less than the threshold for the channel quality metric.

11. The method of claim 10, wherein the message comprises an indication for a failure in the backhaul link and information indicating two nodes which terminate the backhaul link.

12. The method of claim 1, wherein the configuration information comprises information indicating at least one node, and the method further comprises transmitting data to the at least one node according to the configuration information.

13. The method of claim 1, further comprising:
   receiving information indicating at least one node from the base station; and
   transmitting data to the at least one node.

14. The method of claim 13, wherein the information further indicates transmitting the data to the at least one node via a radio link control message.

15. The method of claim 12, wherein the at least one node is a downstreaming node of the integrated access and backhaul node and the data is transmitted via a radio link control message.

16. The method of claim 12, wherein the data to be transmitted includes data which has not been acknowledged.

17. The method of claim 12, further comprising:
receiving a radio link control status report from either the base station or the at least one node; and
determining the data to be transmitted based on the radio link control status report.

18. The method of claim 17, further comprising receiving, from the base station, a message instructing the transmission of the data via a radio link control message.

19. An integrated access and backhaul (IAB) node, comprising:
at least one memory; and
at least one processor coupled with the at least one memory and configured to cause the IAB node to:
receive configuration information from a base station, the configuration information comprising:
parameters for reporting assistant information on a backhaul link;
an indication of an access node of the IAB node; and
a value of a timer associated with the access node;
transmit a message indicating the assistant information on the backhaul link according to the configuration information; and
start the timer in response to receiving data from the access node; or
start the timer in response to transmitting data to the access node.

* * * * *